(12) United States Patent
Lehew et al.

(10) Patent No.: US 6,976,077 B1
(45) Date of Patent: Dec. 13, 2005

(54) AUTOMATIC AND TRANSPARENT SYNCHRONIZATION OF SERVER-SIDE STATE INFORMATION WITH A CLIENT APPLICATION

(75) Inventors: Christian R. Lehew, Redmond, WA (US); Michael L. Waterston, Seattle, WA (US); Robert A. Kleewein, Issaquah, WA (US); Ian V. Hollier, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/347,753

(22) Filed: Jul. 6, 1999

(51) Int. Cl.[7] .............................................. G06F 15/16
(52) U.S. Cl. ..................... 709/229; 709/217; 709/219; 709/225; 709/226
(58) Field of Search ................. 709/217, 219, 709/225, 226, 229; 705/35, 42, 44

(56) References Cited

U.S. PATENT DOCUMENTS

| | | | | |
|---|---|---|---|---|
| 5,973,972 A | * | 10/1999 | Kwon et al. ................ | 365/203 |
| 6,006,332 A | * | 12/1999 | Rabne et al. ............... | 713/201 |
| 6,032,150 A | * | 2/2000 | Nguyen ....................... | 707/102 |
| 6,052,730 A | * | 4/2000 | Felciano et al. ............ | 709/225 |
| 6,085,249 A | * | 7/2000 | Wang et al. ................ | 709/229 |
| 6,092,196 A | * | 7/2000 | Reiche ........................ | 713/200 |
| 6,212,640 B1 | * | 4/2001 | Abdelnur et al. ........... | 713/201 |
| 6,226,752 B1 | * | 5/2001 | Gupta et al. ................ | 713/201 |
| 6,266,681 B1 | * | 7/2001 | Guthrie ..................... | 715/501.1 |
| 6,336,135 B1 | * | 1/2002 | Niblett et al. .............. | 709/215 |
| 6,374,359 B1 | * | 4/2002 | Shrader et al. ............. | 713/201 |
| 6,476,833 B1 | * | 11/2002 | Moshfeghi ................... | 345/854 |
| 6,757,716 B1 | * | 6/2004 | Blegen et al. .............. | 709/217 |

* cited by examiner

*Primary Examiner*—Saleh Najjar
(74) *Attorney, Agent, or Firm*—Law Offices of Albert S. Michalik, PLLC

(57) ABSTRACT

A method and system via which a client application hosting a browser notifies a server of its existence, whereby the server provides enhanced operating functionality, such as state synchronization, to the client. Instead of requesting a server's normally-accessible website, a client application provides a URL to a hosted browser to access a hidden web page. The hidden web page returns awareness information (e.g., a "cookie") identifying the client as an enhanced client, and also automatically forwards the client to the server's normally-accessible website. Based on the awareness data, the server distinguishes enhanced clients from ordinary clients, and modifies its behavior accordingly. For example, the server and client application may communicate in the background, such as to synchronize the client application's data with server state information. To synchronize, the server data may be written into a client storage mechanism, or the server data may be passed in a page.

28 Claims, 7 Drawing Sheets

Unpaid Bills

Your unpaid bills are listed below. Click the biller name to open the bill and pay it.

| Date Received | Company | Date Due: | Minimum Due: | Total Due: |
|---|---|---|---|---|
| 5/23/99 | The Long Distance Phone Co. | 6/23/99 | $48.14 | $48.14 |
| 5/25/99 | 123 Cellular UserHusband | 6/25/99 | $45.00 | $857.53 |
| 6/14/99 | XYZ Credit Card Co. | 7/14/99 | $100.00 | $1,250.00 |
| 6/22/99 | 123 Cellular UserWife | 7/22/99 | $45.00 | $857.53 |

*FIG. 4*

AUTOMATIC AND TRANSPARENT SYNCHRONIZATION OF SERVER-SIDE STATE INFORMATION WITH A CLIENT APPLICATION

FIELD OF THE INVENTION

The invention relates generally to computer systems, and more particularly to communication between a client-side computer application and a web server.

BACKGROUND OF THE INVENTION

Some Internet web servers often provide web pages that are personalized for each particular user based on the user's identity and state information maintained at the server for that user. For example, in electronic bill presentment technology, when a user is properly authenticated, a web page is provided to the user displaying the state of that user's current financial bills. The user may pay the bills electronically, whereby the server adjusts the state information to reflect which bill has been paid, how much has been paid, and so on.

At the same time, many users of such custom-generated web pages run software programs on their local machine that deal with related information. For example, a user may track personal financial information, including the state of the user's bills, in an application program such as Microsoft® Corporation's Money99 program.

However, there has heretofore not been a straightforward way to synchronize the state information maintained at the server with the data maintained by the client application program. For example, when a user pays a bill on an electronic bill presentment server, the information is not synchronized with the user's financial data tracked by the application program. The user thus has to make a double entry, once to the server and once in the application program.

A number of solutions may be developed to perform the synchronization, however each these solutions have associated drawbacks. For one, the user could manually request synchronization by clicking on a synchronize button or the like displayed on the web page. However, as can be readily appreciated, not all users will understand this action nor will remember to do so, leading to inconsistencies that confuse and frustrate the user, i.e., many users would not find the link, realize what it did, and/or realize why the link should be clicked.

Another, more complex solution would be to develop a customized, "behind the scenes" mechanism for communicating with electronic bill presentment servers over an Internet connection. However, because of the complexity, it is not cost-efficient to do so, and moreover, would require substantial changes at both the client and server. Yet another solution would be to duplicate server functions at the client, and then have the client update the server. However, this would be performing the same work twice, which is undesirable, and also would lead to problems when the server functions needed to be changed. Moreover, the server has the actual state data, and thus the client would still have to synchronize before presenting information to the user. Lastly, the server could determine whether a client accessing it may have some data to synchronize by modifying browsers to inform the server when the browser is communicating on behalf of a client application. However, this is not a straightforward solution, nor is it backward compatible, as it would require modifying or replacing the large number of existing browsers.

SUMMARY OF THE INVENTION

Briefly, the present invention provides a system and method whereby a client application hosting a browser notifies a server of its existence. Upon recognizing the client application as an enhanced client, the server provides enhanced operating functionality to the client, such as by enabling continuous, silent and automatic state synchronization with a secure website that is designed for use both with and without the client application.

To notify the server of the client application's existence, before a client application hosting a browser requests a server's normally-accessible website, the client application instead provides a URL to the browser to access a special, otherwise hidden web page. The hidden web page writes awareness information (e.g., a "cookie") to a client storage to identify the client as an enhanced client.

The hidden page then automatically forwards the client to the requested website, whereby the server distinguishes the enhanced clients from ordinary clients, and modifies its behavior accordingly. For example, because the server has knowledge that the client application is present, the server and client application may communicate in the background, such as to synchronize the client application's data with server state information. To synchronize, the server data may be written into a client storage mechanism, or the server data may be passed through the client browser as a tagged image file or a file resembling a media file.

Other advantages will become apparent from the following detailed description when taken in conjunction with the drawings, in which:

BRIEF DESCRIPTION OF THE DRAWINGS

FIG. 4 is a representation of financial bill data for an exemplary application;

DETAILED DESCRIPTION OF THE PREFERRED EMBODIMENT

Exemplary Operating Environment

Figure 1:
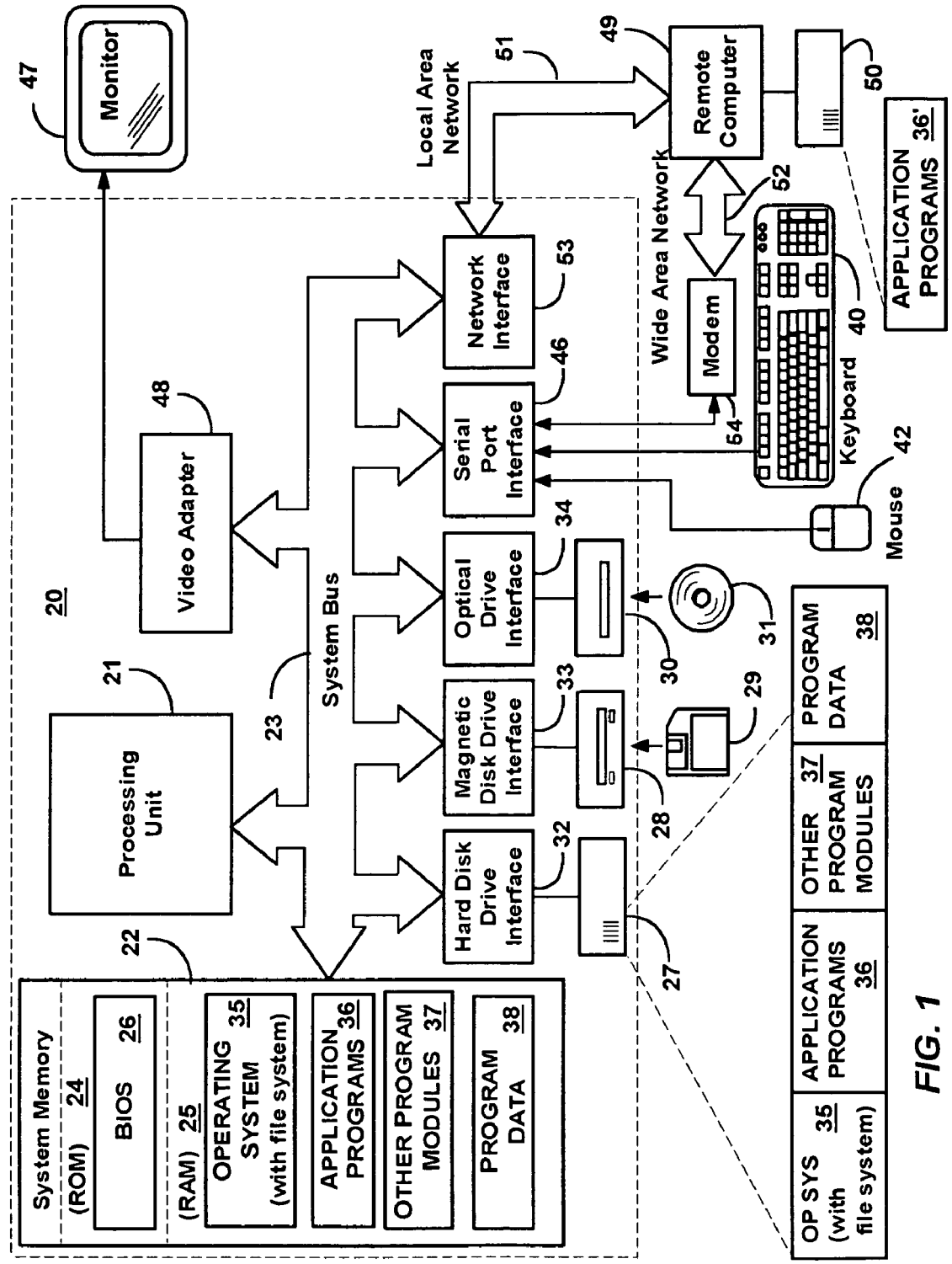
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Client Existence Notification for Enhanced Data Communication

In general, the present invention provides a method and system via which a client application 60 (FIG. 2) of a client machine$_A$ (such as the computer system 20) notifies a server 62 of its existence, enabling continuous, silent and automatic state synchronization with a secure website 64 that is designed for use both with and without the client application 60. To this end, the system and method include a highly flexible architecture as described below that enables the client application to identify itself to the server without modifying the code of existing browsers. While the present invention was originally implemented in a financial environment and thus includes financial-based client and server examples, it should be understood that the present invention is not limited to financial applications, but instead has numerous applications throughout user computing. Moreover, although the various components are shown and described herein as separate components because of certain benefits resulting from separated functionality, it can be readily appreciated that some or all of the components may be combined into more complex components, and/or separated even further into additional components.

Figure 2:
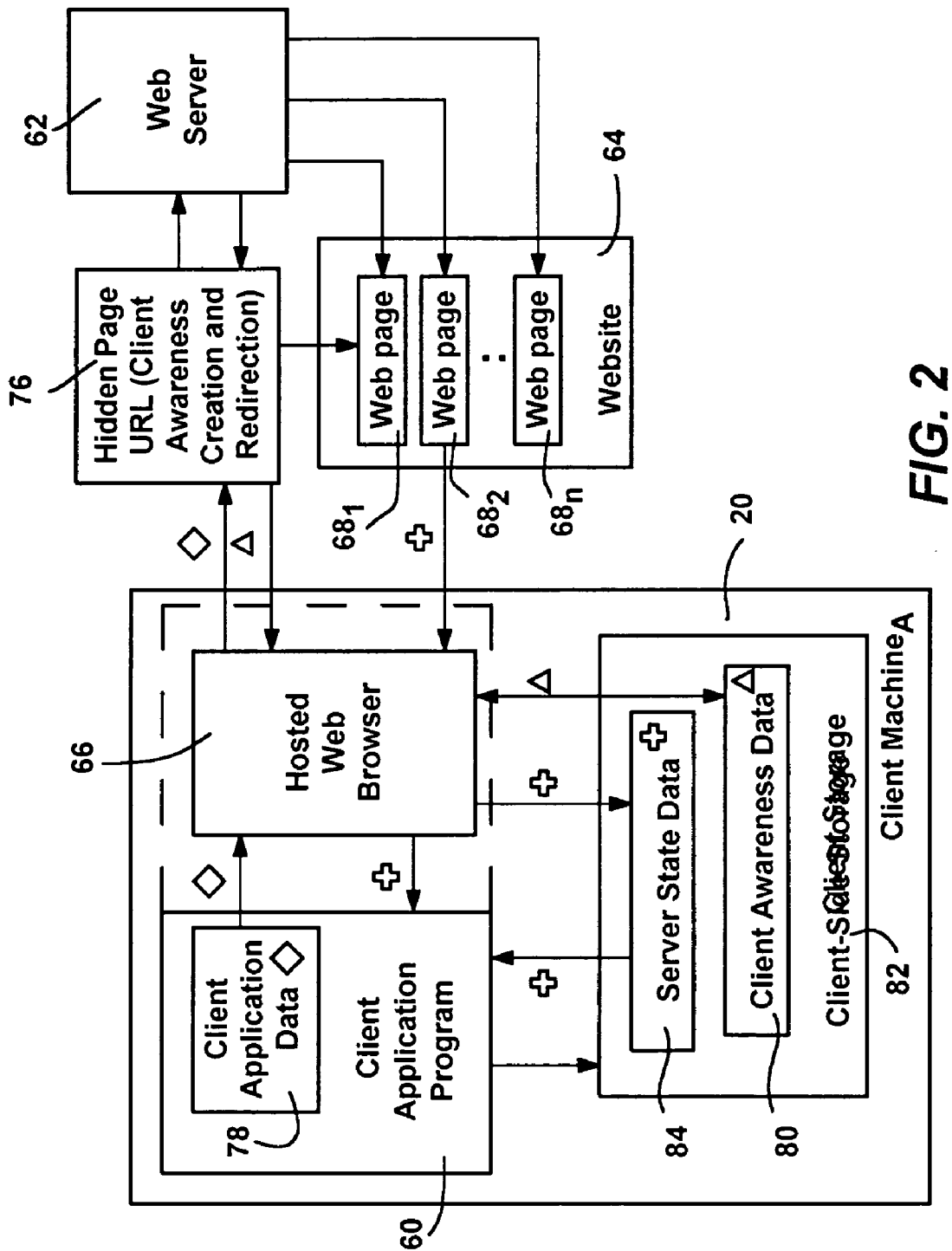
FIG. 2 is a block diagram representing a general architecture into which the present invention may be incorporated.
Figure 3:
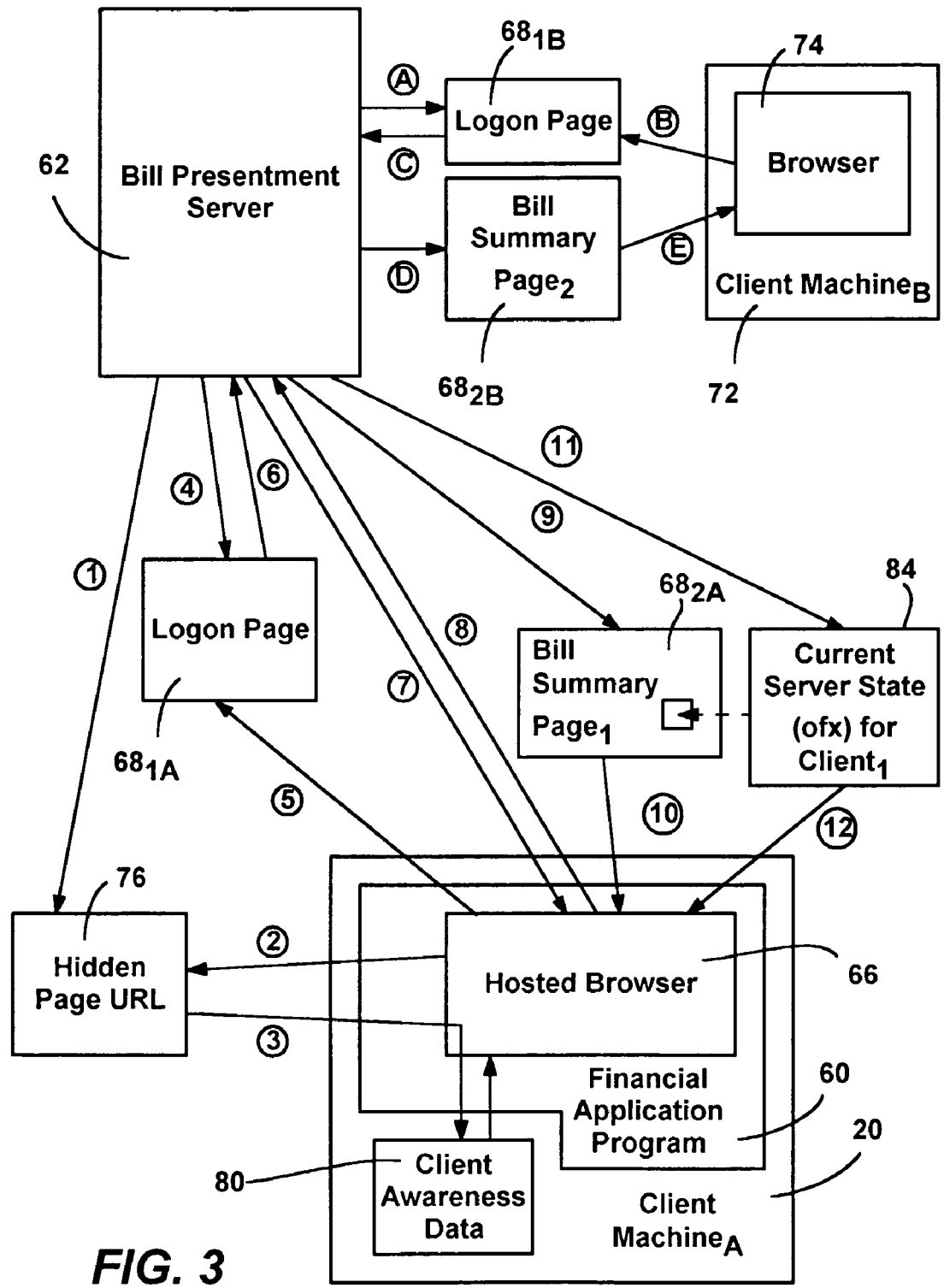
FIG. 3 is a block diagram representing how a client and server communicate data over time in accordance with one aspect of the present invention.

As represented in FIGS. 2 and 3 of the drawings, the client application 60 such as Microsoft® Corporation's Money99 hosts a web browser 66 (in-situ) such as Microsoft® Corporation's Internet Explorer, to enable users to view web pages $68_1$–$68_n$ of the server 62. By way of example, one such server (e.g., the server 62) may provide electronic bill presentment, whereby authenticated users have a personalized web page (e.g., $68_{2A}$) sent thereto via which the users can see their bills and make electronic payments on those bills. For example, as represented in the partially-rendered web page $68_{2A}$ of FIG. 4, a representation 70, of one bill (e.g., a monthly instance 70, of a bill model) may be generated for a telephone bill, another representation $70_2$ for a first cellular bill, and so forth, generally ordered by date.

Note that although only one server 62 and website 64 is shown in FIGS. 2 and 3, it is understood that the web pages $68_1$–$68_n$ may be distributed among many websites and/or servers.

As represented in FIG. 3, a user, such as from a different client machine$_B$ 72 that is not accessing the bill presentment server 62 through the client application 60, but rather directly through a browser 74, (or another application hosting the browser 74), will be provided with a normal logon page, e.g., $68_{1B}$. This is represented by the arrow labeled with circled letter "A" in FIG. 3. Of course, the server 62 first may provide other web pages (e.g., a home page) with a link to the logon page $68_{2B}$, but to see secure personalized information, the user ultimately will need to be authenticated via the logon page $68_{2B}$ or in some other manner. When the page 682B is rendered by the browser 74 of machine 72, the user provides logon information (arrow with circled letter "B"), which is passed to the server 62 (arrow with circled letter "C") or some other authentication mechanism. If the user is authenticated by the server 62, which may occur in a well-known manner, the server 62 generates and provides the user with a personalized web page $68_{2B}$ of bill information (the arrows labeled with circled letters D and E).

In accordance with one aspect of the present invention, when the client application 60 (e.g., on the computer system 20) hosts the browser 66, the client application 60 does not direct the browser 66 to the logon page or other normally accessible page of the website 64. Instead, when a user wishes to receive a personalized bill presentment page $68_{2A}$, the client application 60 provides the hosted browser 66 with a URL (Uniform Resource Locator) of a hidden (out-of-band) page 76. The page can be kept hidden from the user by redirecting the browser to a second visible page after the hidden page has been downloaded. Essentially, only the client application 60 knows of this hidden page 76, although there are straightforward ways (e.g., via a client identifier) to ensure that only proper clients may use the hidden page 76. The client application 60 further may pass application data 78 (FIG. 2) to the hidden page URL 76 as part of the URL string it passes to the browser 66 when requesting access thereto. As described below, this data 78 may include the current state of the client application's data such as via a timestamp recording the last time the client application 60 was synchronized with server state information. The passed data 78 may be in virtually any agreed-upon format, and may also include information such as a program identification number, a URL specifying the visible page for the browser to be passed to, unique client instance identifiers, and user authentication information. In FIG. 2, the transmission of the client application data 78 is represented as a small diamond, while in FIG. 3, the providing of the hidden page 76, access thereto, and passing of the data client application data 78 is represented by the arrows labeled with circled numerals one (1) and two (2). In FIG. 3, the values of the circled numerals generally represent the time-order of a typical communication sequence and the actions resulting therefrom. Note that the user is not intended to realize that this hidden page 76 has been accessed, e.g., the browser 66 typically gets redirected by the server to a visible page at this time.

In accordance with another aspect of the present invention, by properly accessing the hidden page 76, the client application 60 will be considered an enhanced application by the server 62. To identify the client application 60 as enhanced, the hidden page 76 writes client awareness data 80 (essentially a cookie) through the web browser 66 to a client storage mechanism 82. In FIG. 2, the passing of the client awareness data 80 is represented by a small triangle, while in FIG. 3, the arrow labeled with circled numeral three (3) represents the writing of this cookie to the client.

Once the client awareness data 80 is written, the hidden page 76 silently (i.e., without user interface) forwards the client to another URL page of the website 64. For example, in order to identify a Money99 client application to the bill presentment website 64, on the request for the bill summary list, the browser 66 may be given a URL string that includes:

http://www.transpoint.com/MakeMoneyCookie.asp?URL=
http://www.transpoint.com/summarylist.asp The http://www.transpoint.com/MakeMoneyCookie.asp page creates the client awareness data (session cookie) on the user's machine as described above, and then redirects to the URL specified as the argument (http://www.transpoint.com/summarylist.asp). The ASP page that creates the session cookie will most likely be at the bill publisher site, since they are likely to want to download information to enhanced clients, however this is not a requirement. For example, in the case of XYZ Bank, the string may include:

http://www.transpoint.com/MakeMoneyCookie.asp?URL=
http://www.xyzbank.com/summarylist.htm For security purposes, the browser 66 may be first redirected to a logon page $68_{1A}$ as represented in FIG. 3 by the arrow labeled with circled numeral four (4), whereby the user may enter authentication credentials, represented by the arrows labeled with circled numerals five (5) and six (6). Note that by interacting through the browser 66 to obtain credentials via information recorded in the client application program 60, the hidden page 76 may take care of the authentication without the need for additional user input following each request for bill presentment.

At this time, a properly authenticated user may receive personalized information from the server 62. In keeping with the present invention, however, as shown in FIG. 3 the server 62 further determines whether the client is enhanced by requesting the client awareness data 80 from the client via the browser 66. If the client has the proper awareness data 80, the client will be considered enhanced and receive additional information and/or operating functionality from the server 62, otherwise the client will be considered non-enhanced, e.g., incapable of handling the additional information. In this manner, ordinary browsers may still access the website 64 in the normal manner without noticing any change in operation, while enhanced clients, i.e., browsers hosted by proper client application programs will be provided with extended functionality and may dynamically modify their behavior accordingly. Note that the client awareness data 80 may include the client application data 78 passed to the hidden web page 76, e.g., so that the server may obtain the timestamp when the server checks for the client awareness data 80. The arrows labeled with circled numerals seven (7) and eight (8) in FIG. 3 represent the retrieval by the server 62 of the client awareness data 80 associated with the client application program 60.

Figure 5:
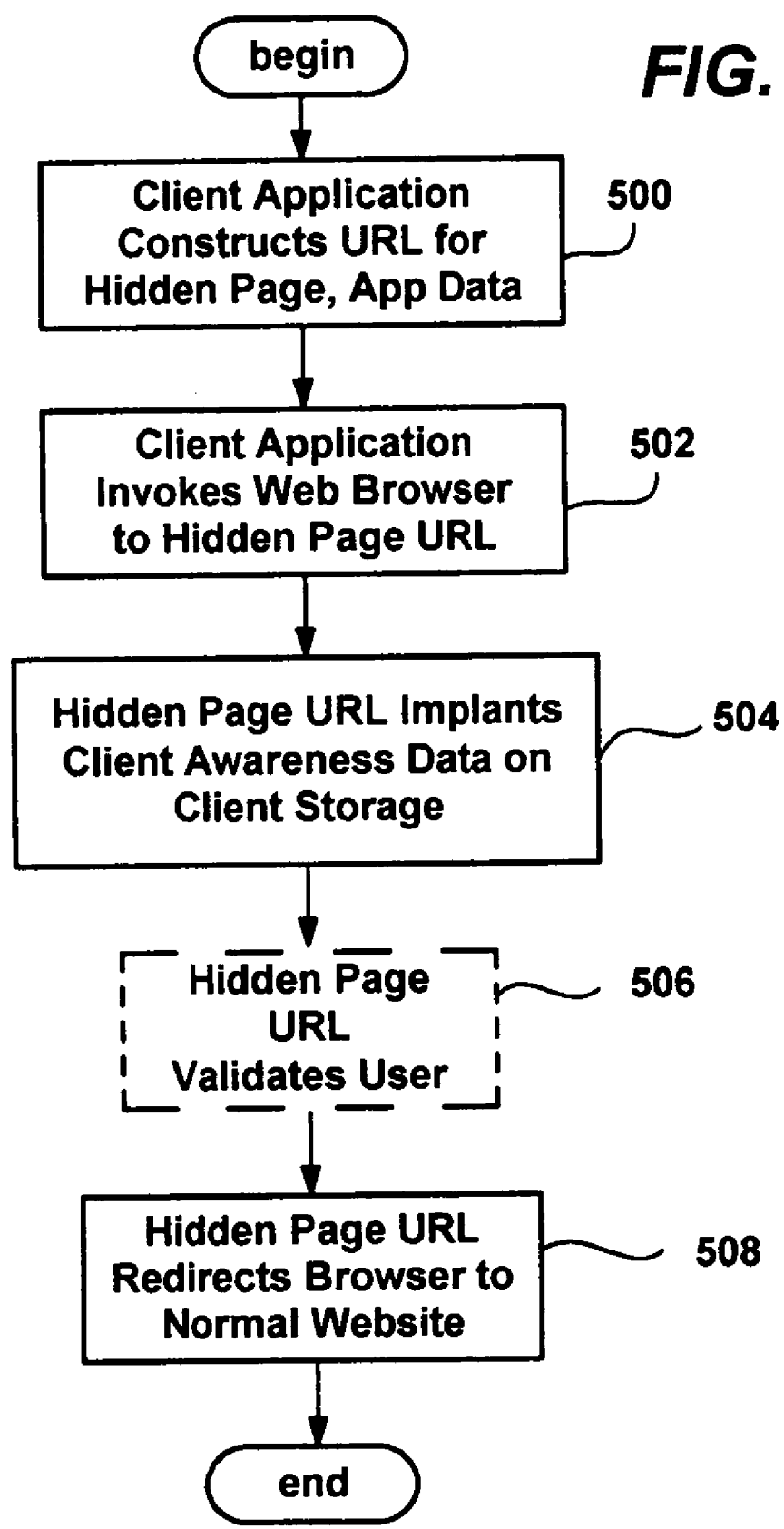
FIG. 5 is a flow diagram generally representing the steps taken to prepare a client for enhanced communication with a server in accordance with one aspect of the present invention.

To summarize, as shown in FIG. 5 beginning at steps 500–502, the client application 60 provides a URL that corresponds to the hidden web page 76 along with client application data 78, and passes the constructed URL string to the browser 66, first loading the browser 66 if needed. When the hidden web page 76 is accessed, the client awareness data 80, which may incorporate the client application data 78, is implanted to the client storage 82 at step 504. Step 506 (shown as a dashed box to indicate optional) represents the validation of the user by the hidden page 76, while step 510 represents the redirection of the client browser 66 to the normal website 64. Note that if the hidden web page 76 does not perform the authentication at step 506, the redirection to the normal website 64 at step 510 may be to an appropriate logon page that facilitates the authentication.

Returning to FIGS. 2 and 3, at this time, the server 62 has validated the user and via the client awareness data 80 has also recognized the browser 66 as an enhanced client, i.e., as being hosted by an enhanced client application 60 in the present example. The server 62 is thus aware that it may perform some enhanced operation with respect to the client, e.g., send additional information to the client application 60, allow access to different web pages, and so on. In FIG. 2, a plus sign represents the movement of the server state data 84 through the various components. Note that the authentication or the like used for generating the personalized bill summary page $68_{2A}$ provided at the logon page $68_{1A}$ may be used to provide security for downloading the additional information, without requiring the user to re-enter the credentials.

The modified server behavior is based on recognition of existence of the proper client application, as opposed to differentiation solely by user credentials. By way of example, the server 62 may provide its enhanced clients with pages having a different color scheme, so that when a user connects through the client application 60, the enhanced status is more recognizable to users. Non-enhanced clients may receive pages with a different color scheme, and possibly a warning informing them that any state changes made (e.g., a bill payment) will not be synchronized with any local application program (e.g., personal financial application software) on their local machine. This warning may be limited to being displayed only to non-enhanced users who have previously connected as enhanced clients, by maintaining some additional state information for each such user at the server 62.

A first way in which to provide additional information (e.g., server state data 84) to the enhanced client 60 is to send the information as a cookie, whereby as with other persistent cookies, the browser 66 writes the server state data 84 to the client side storage 82 for the client application to access. The timestamp provided in the client application data 78 and maintained in the client awareness data 80 may be first checked to determine if the data is needed at the client, and if so, what amount of data is needed. For example, to synchronize bill payments made at the server 62 with the user's application data, (e.g., maintained in bill models representing those bills), only the payment information since the last-synchronized time need be communicated in the server state information 84. The state information 84 for this particular client may be sent before the bill summary page $68_{2B}$ personalized therefor is sent, after it is sent, or at the same time it is sent, as generally represented in FIG. 3 by the arrows accompanied by circled numerals nine (9) through twelve (12). Once written to the client storage 82, the client application 60 may then read the storage mechanism 82 as necessary to find the cookie and obtain the information therein, for example, on some time interval or as the browser 66 navigates.

In an alternative implementation, the server 62 may include the additional information in a web page, such as in the bill summary web page $68_{2A}$ (HTML) provided to the user. To this end, when the server 62 detects an enhanced client 60, the server 62 includes a new image tag on the summary web page $68_{2A}$ indicating a source. The source for this image tag is not actually an image, but rather a file of the server state data for that client having a content type and an extension (e.g., ofx, a file format used for storing financial data) that is registered with the client application 60, whereby the client application 60 is passed the file automatically after the download. A special moniker can also be registered with the client application so that information following the moniker is passed by the browser to the client application. By using the special moniker in the image tag, the server can specify a file for the client application to download. The dashed line in FIG. 3 from the server state data 84 into the bill summary page $68_{2A}$ represents this alternative way of communicating the additional information. For example, the following may be used to perform the download:

---

<img src = "money:onlinedownloadebpp+http://www.msfdc.com/money.asp+UserId123" height=1 width=1>

---

In this case, the string "money:" is an instruction to the client web browser to run a function registered with the string "money:" This function is uses the remainder of the string ("onlinedownloadebpp+http://www.msfdc.com/money.asp+UserId123") to determine that the server wants it to download the OFX data from the bill presentment web site using the URL http://www.msfdc.com/money.asp+UserId123. In this way, it is the server that knows that it has data to download, but it is the client that actually initiates the data transfer. The download will be automatically performed when the page is rendered. This will result in a one pixel-by-one pixel bitmap being displayed on the screen, which will not be very noticeable to most users.

Instead of using an image tag, the browser can also be instructed to download the .ofx file by client-side script contained in the page. For example, the following code will instruct the browser to download the file:

---

<SCRIPT FOR=window EVENT=onload LANGUAGE="javascript">
window.location=https://ebills.transpoint.com/money.ofx
</SCRIPT>

---

In another implementation, the system registry in the client machine 20 may be modified to treat a specific extension as if it were a media type such that the browser 66 does not provide any user interface prior to the download. The HTML page returned includes a tag that causes the browser to attempt to "play" a media type (audio/video) on the client machine. The source for that media is not actually media, but rather the server state information file 84 that includes the updated data for the data the client application. The client application 60 is registered with the system as a media player, whereby when the browser 66 invokes it to play the media type, the incoming data stream is read and processed without displaying any user interface. As can be appreciated, displaying file download options on a user interface may confuse users at this time since most users will not realize that any download and synchronization operation is taking place.

Figure 6:
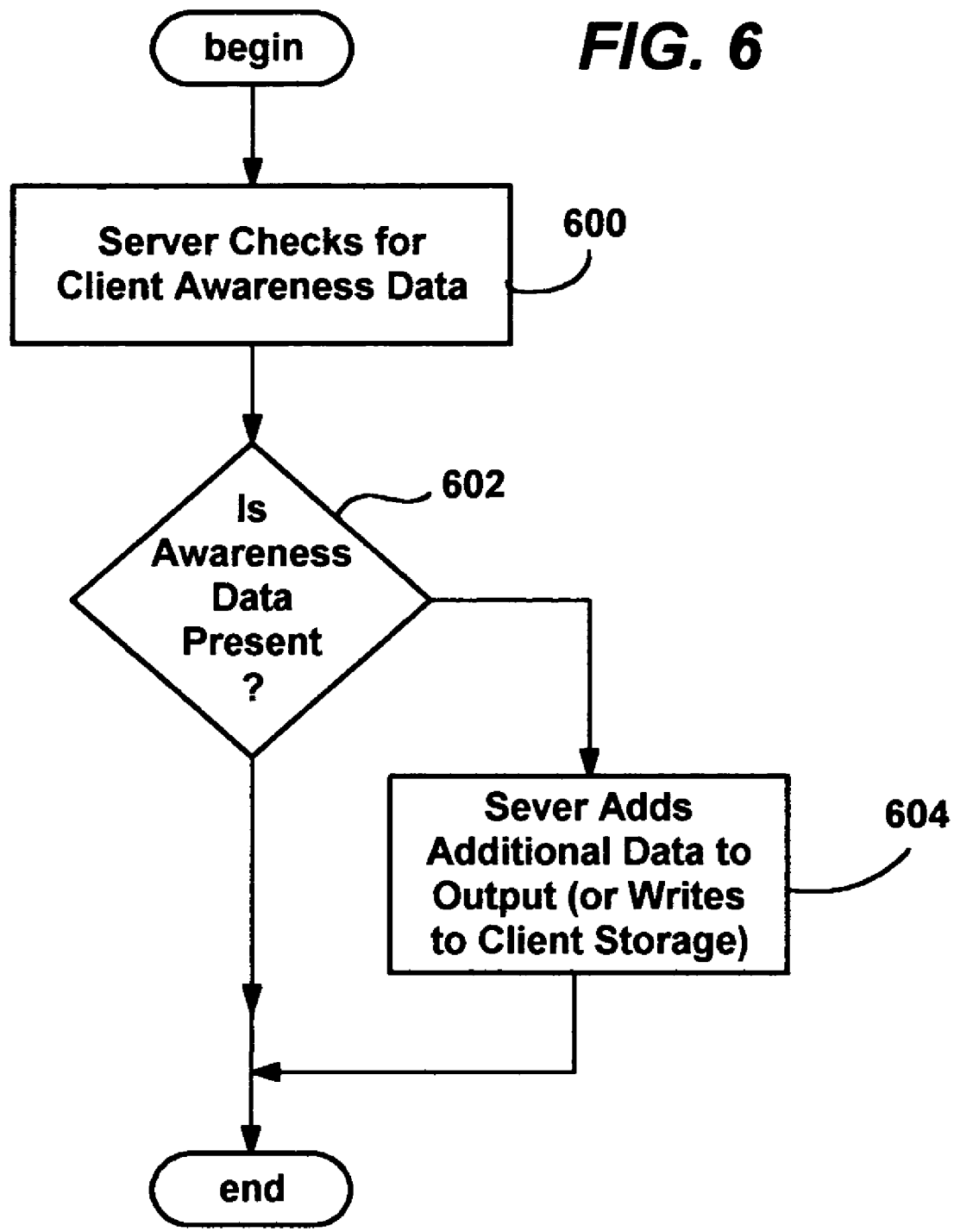
FIG. 6 is a flow diagram generally representing the steps taken at the server to provide additional data to enhanced clients in accordance with one aspect of the present invention.

FIG. 6 generally summarizes the operation of various aspects of the present invention following the writing of the client awareness data 80 to the client storage 82. At steps 600–602, the server 62 checks for the client awareness data 80. If present, the server 62 recognizes the client as an enhanced client, whereby at step 604 the server 62 provides enhanced functionality, e.g., provides the client with additional data by adding it to the output stream or writing a cookie as described above. As can be appreciated, other server 62 operations and behaviors may be varied based on whether a client is enhanced.

Figure 7:
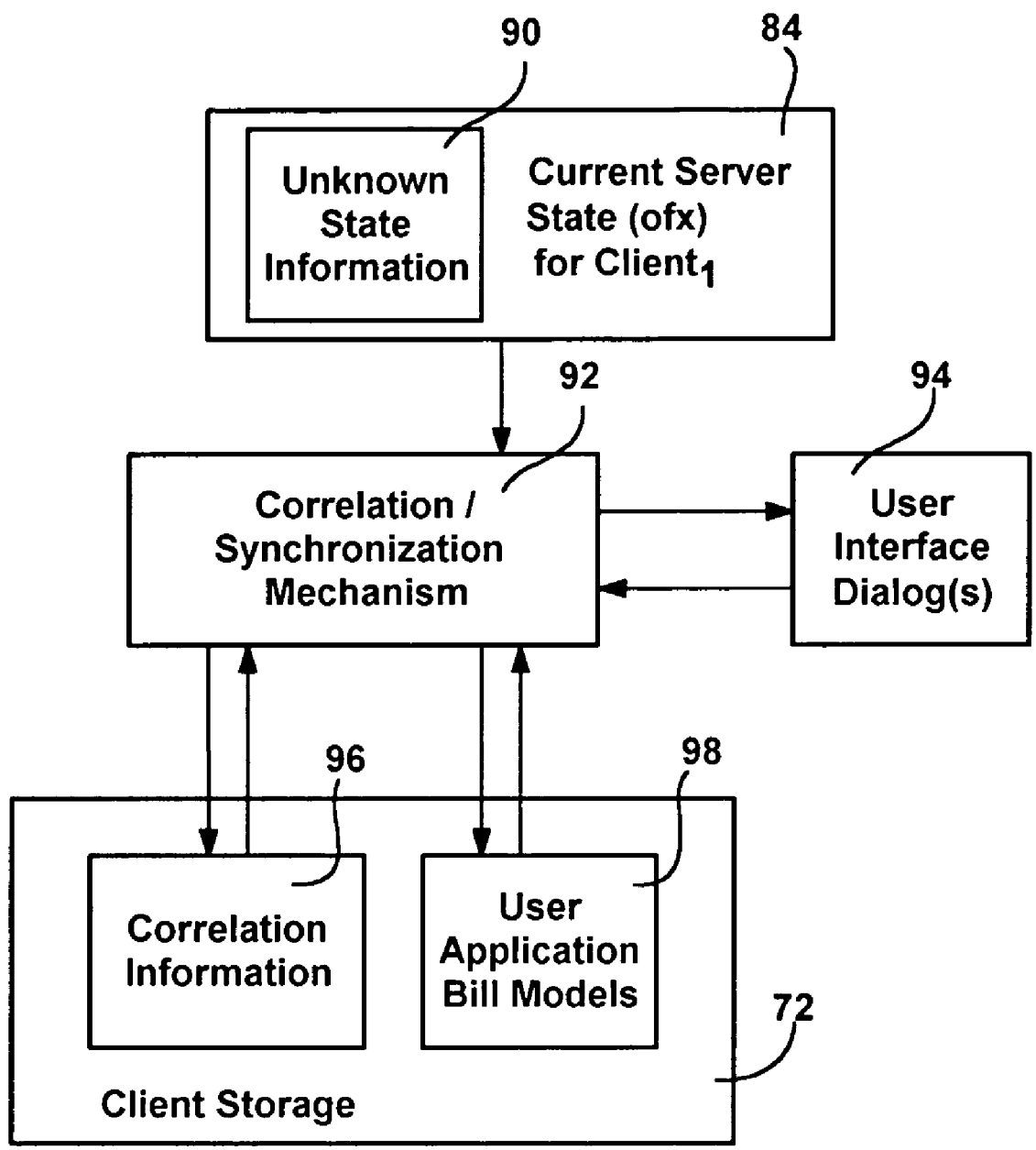
FIG. 7 is a block diagram representing general components for synchronizing and/or linking downloaded server state information with client user application data.

FIG. 7 generally represents components for synchronizing the additional information in the exemplary financial application environment. To be synchronized, the presented bill information needs to be linked to the bill model of the application program. For example, three pieces of information in the presented bill may be used to establish a link to the application's bill model, e.g., a bill publisher identifier, a biller identifier and an account identifier which when used together, uniquely identify to which model a downloaded bill belongs.

As shown in FIG. 7, when the server state data 84 is downloaded, possibly including some unknown information 90, a correlation/synchronization mechanism 92 processes the information to update the users' client application data as appropriate. By way of illustration of how the changed server behavior may benefit enhanced clients, the following generally sets forth the process performed by the correlation/synchronization mechanism 92 in walking through a list of downloaded presented bills and linking to models:

```
for (each downloaded presented bill) {
    if (any downloaded bills have not been linked to models or
    account numbers are unknown) {
        show wizard start screen
        for (each unlinked or account number unknown) {
            if {presenter model ID does not exsist in any model)
            {
                display model matching screen
                if (matched to an existing model) {
                    if (model already linked with different
                    presentment info) {
                        display already linked screen
                    }
                    else if (model setup as an Apay) {
                        display OK Apay warning dialog:
                        ┌─────────────────────────────────────┐
                        │ You cannot match this E-bill to the bill you have │
                        │ selected because it has been set up in Money as an │
                        │ automatic payment (Apay).           │
                        │ To cancel a scheduled automatic payment, go to the │
                        │ Bills & Deposits area in Money and, in the left pane, │
                        │ click Setup Bills & Deposits. Select the Apay you │
                        │ want to cancel, and then click Delete at the bottom │
                        │ of the screen.                      │
                        │                              [OK]   │
                        └─────────────────────────────────────┘
                    }
                    else
```

```
                        override model payment method
                        if (payee name on download bill != payee
                        name on model}
                        }
                            display payee correction screen
                    }
                    link to model
                }
                if (downloaded bill was paid)
                    if (account number has not been linked to Money
                    account)
                        display account matching screen
            }
            show wizard end screen
    }
    if (downloaded bill is linked to a model) {
        if (downloaded bill was paid) {
            record paid bill into appropriate account register
            checking to ensure it is not already there; if already
            there update amount, date, and VOID status if necessary;
            ignore non-exsisting VOID downloaded bill.
                Store category/payee from next instance into
            recorded transaction if confirmed.
                let user fix invalid split data in same manner as
            downloaded statement tran.
        }
        else {
            store amount, date, and bill URI. into next instance
            of matching model.
                let user fix invalid split data in same manner as
            downloaded statement tran.
            }
        }
    }
```

As can be understood from the above process, one or more suitable user interface dialogs 94 or the like are displayed to the user to correlate any unknown bill information 90 to an appropriate bill model of the client application program 60. The correlation information 96 to link to the appropriate application's bill models 98 (bill publisher identifier, biller identifier, account identifier) is stored such that the user will not ordinarily receive the user interface dialogs again.

As can be seen from the foregoing detailed description, there is provided a method and system which a client application hosting a browser notifies a server of its existence, enabling continuous, silent, and automatic state synchronization with a secure website designed for use both with and without the client application. Recognized clients are given enhanced server functionality, for example, to download server state information thereto. The method and system are flexible and extensible, and straightforward to implement, e.g., without requiring changes to browsers, duplication of server functions, or a complex custom-built solution.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, comprising:

at a browser hosted by a client application program, receiving a request from the client application program to instruct the browser to access a web page, the request providing information to the browser including a network location of the web page, the network location comprising a location only accessible by the browser that is hosted by the client application;

accessing the web page with the browser at a server in response to the request from the client application program;

receiving information about the web page in response to the accessing of the web page;

writing the information received from the server to a client storage;

providing the server with data corresponding to the information received from the server about the web page written into the client storage, the data indicating to the server that the browser is being hosted by the client application;

receiving state information directed to the client application from the server based on the data having been provided to the server; and redirecting the browser to another web page that may be rendered for display to a user.

2. The computer-readable medium of claim 1 having further computer-executable instructions comprising invoking the browser from the client application.

3. The computer-readable medium having computer-executable instructions of claim 1 wherein accessing the web page includes passing data to the web page.

4. The computer-readable medium having computer-executable instructions of claim 3 wherein the data passed to the web page includes time information indicative of a synchronization time with the server state information.

5. The computer-readable medium having computer-executable instructions of claim 3 wherein receiving information from the web page includes receiving at least some of the data passed thereto.

6. The computer-readable medium having computer-executable instructions of claim 1 wherein receiving state information from the server includes receiving data maintained at the server for synchronizing with data of the client application program.

7. The computer-readable medium having computer-executable instructions of claim 6 wherein the data maintained at the server includes financial data.

8. The computer-readable medium of claim 6 having further computer-executable instructions comprising synchronizing the state information with data of the client application program.

9. The computer-readable medium of claim 1 having further computer-executable instructions comprising linking the state information to data of the client application program.

10. The computer-readable medium having computer-executable instructions of claim 1 wherein receiving state information from the server includes receiving in a page of data an image tag identifying a source of the state information.

11. The computer-readable medium having computer-executable instructions of claim 1 wherein receiving state information from the server includes receiving in a page of data an image tag identifying a registered media type.

12. The computer-readable medium having computer-executable instructions of claim 1 wherein receiving state information from the server includes receiving a cookie written into a client-side storage.

13. The computer-readable medium having computer-executable instructions of claim 1 wherein providing a server with data includes providing the server with a timestamp of a synchronization time of server state information.

14. The computer-readable medium having computer-executable instructions of claim 1 wherein providing a server with data includes providing the server with a client identifier.

15. The computer-readable medium of claim 1 having further computer-executable instructions comprising providing authentication information to the server.

16. A computer-readable medium having computer-executable instructions, comprising:

providing a first web page, the web page having a network location only accessible by a browser being hosted by a corresponding client application program;

receiving a request from the client browser to access the first web page;

communicating information about the first web page to the client browser, the information indicating that the first web page was accessed;

redirecting the client browser to another web page that may be rendered for display to a user;

at a server corresponding to the other web page, detecting the information indicating that the first web page was accessed; and communicating data from the server to the client application program.

17. The computer-readable medium having computer-executable instructions of claim 16 wherein detecting the information includes requesting awareness information at a server from the client browser, the awareness information corresponding to the information communicated thereto from the first web page.

18. The computer-readable medium having computer-executable instructions of claim 17 wherein detecting the information includes determining whether the awareness information is received, and if so, wherein operating to communicate the data includes providing state information directed to the client application program through the browser.

19. The computer-readable medium of claim 16 having further computer-executable instructions comprising receiving authentication information from the client at the other web page.

20. The computer-readable medium of claim 16 having further computer-executable instructions comprising providing a personalized web page to the client.

21. The computer-readable medium of claim 16 having further computer-executable instructions comprising receiving data from the client corresponding to information communicated from the first web page to the client.

22. The computer-readable medium having computer-executable instructions of claim 21 wherein the data received from the client includes a timestamp for synchronizing server state data therewith.

23. The computer-readable medium of claim 22 having further computer-executable instructions comprising communicating state data to the client based on the timestamp.

24. The computer-readable medium having computer-executable instructions of claim 18 wherein providing the state information includes attaching the state information to a personalized web page generated at the server for the client.

25. The computer-readable medium having computer-executable instructions of claim 16 wherein redirecting the client to another web page includes redirecting the client to a logon page.

26. A system for enhanced communication between a server and a client, comprising, a client including an application program and a browser hosted by the application program;

a server connected to the client via a transmission medium;

a first web page having a network location and operable to provide awareness data for writing to a storage of the client, the network location comprising a location only accessible by the browser that is hosted by the client application;

another web page, the browser redirected thereto and wherein the server is provided with the awareness data about the first web page; and the server detecting the data to recognize that the browser is being hosted by the application program and providing enhanced functionality to the application program based on the receipt of the awareness data.

27. The system of claim 26 wherein the client provides information to the server indicative of the state of client data.

28. The system of claim 27 wherein the server provides enhanced functionality by outputting information to the client to synchronize the client data.

* * * * *

UNITED STATES PATENT AND TRADEMARK OFFICE
CERTIFICATE OF CORRECTION

PATENT NO. : 6,976,077 B1
APPLICATION NO. : 09/347753
DATED : December 13, 2005
INVENTOR(S) : Christian R. Lehew et al.

It is certified that error appears in the above-identified patent and that said Letters Patent is hereby corrected as shown below:

In column 4, line 64, delete "70," and insert -- $70_1$ --, therefor.

In column 4, line 65, delete "70," and insert -- $70_1$ --, therefor.

In column 5, line 16, delete "682B" and insert -- $68_{2B}$ --, therefor.

In column 6, line 17-25, delete "The http://www.transpoint.com/MakeMoneyCookie.asp page creates the client awareness data (session cookie) on the user's machine as described above, and then redirects to the URL specified as the argument (http://www.transpoint.com/summarylist.asp). The ASP page that creates the session cookie will most likely be at the bill publisher site, since they are likely to want to download information to enhanced clients, however this is not a requirement. For example, in the case of XYZ Bank, the string may include:" and insert -- The http://www.transpoint.com/MakeMoneyCookie.asp page creates the client awareness data (session cookie) on the user's machine as described above, and then redirects to the URL specified as the argument (http://www.transpoint.com/summarylist.asp). The ASP page that creates the session cookie will most likely be at the bill publisher site, since they are likely to want to download information to enhanced clients, however this is not a requirement. For example, in the case of XYZ Bank, the string may include: --, therefor, on line 17 as the continuation of the paragraph.

In column 8, line 41, delete "UserId123" )" and insert -- UserId123") --, therefor.

In column 9, line 52, delete "{presenter" and insert -- (presenter --, therefor.

In column 9, line 52, delete "exsist" and insert -- exist --, therefor.

In column 10, line 4, delete "download" and insert -- downloaded --, therefor.

In column 10, line 5, delete "model}" and insert -- model) --, therefor.

In column 10, line 17, delete "non-exsisting" and insert -- non-existing --, therefor.

UNITED STATES PATENT AND TRADEMARK OFFICE
CERTIFICATE OF CORRECTION

PATENT NO. : 6,976,077 B1
APPLICATION NO. : 09/347753
DATED : December 13, 2005
INVENTOR(S) : Christian R. Lehew et al.

It is certified that error appears in the above-identified patent and that said Letters Patent is hereby corrected as shown below:

In column 10, line 22, delete "URI." and insert -- URL --, therefor.

Signed and Sealed this

Twenty-first Day of July, 2009

JOHN DOLL
*Acting Director of the United States Patent and Trademark Office*